United States Patent [19]

Hubbard et al.

[11] 4,446,779
[45] May 8, 1984

[54] MEAT PROCESSOR

[76] Inventors: Raymond W. Hubbard, 1746 W. Longview Ave., Stockton, Calif. 95201; John B. Seiffhart, 867 Kramer Dr., Lodi, Calif. 95240; Thomas Hubbard, 3461 W. Michigan, Stockton, Calif. 95204

[21] Appl. No.: 482,270

[22] Filed: Apr. 8, 1983

Related U.S. Application Data

[63] Continuation of Ser. No. 213,555, Dec. 5, 1980, abandoned.

[51] Int. Cl.³ .......................... A23B 4/00; A23B 4/02; A23B 4/14
[52] U.S. Cl. ...................... 99/472; 51/164.1; 99/517; 99/535; 366/110; 366/139; 366/144; 366/219
[58] Field of Search .......................... 99/348, 453–455, 99/472, 516, 532, 533, 535, 517; 366/55, 110, 111, 114, 128, 139, 144, 149, 220, 236, 605, 219; 17/25; 51/164.1, 164.2, 164.5, 281

[56] References Cited

U.S. PATENT DOCUMENTS

| 2,898,711 | 8/1957 | Kilbane | 51/164 |
| 2,912,803 | 10/1957 | Simjian | 51/281 |
| 2,952,950 | 4/1958 | Morris | 51/164 |
| 3,093,941 | 6/1963 | Carrier et al. | 51/164.1 |
| 3,216,666 | 11/1965 | Svensson | 241/176 |
| 4,036,122 | 7/1977 | Langen | 99/533 |
| 4,172,339 | 10/1979 | Balz | 51/164.2 |
| 4,214,518 | 7/1980 | Petsche | 99/535 |
| 4,216,566 | 8/1980 | Bettcher | 17/25 |
| 4,262,549 | 4/1981 | Schwellenbach | 366/128 |

FOREIGN PATENT DOCUMENTS

| 2720732 | 11/1978 | Fed. Rep. of Germany | 99/535 |
| 556774 | 7/1977 | U.S.S.R. | 99/535 |

OTHER PUBLICATIONS

*Meat Industry*, Apr. 1977, pp. 36–38.
*The National Provisioner*, Sep. 13, 1980, pp. 26 ff.
Franz-Fleischereimaschinen brochure "The 'New' Generation of the Massage Technologie".
Globus Laboratories, Inc. advertisement in *Meat Industry*/May, 1980, "Vacuum Massage=100% Yield".
Meat Systems Corp. advertisement in *Meat Processing*, Apr., 1980.
Meat Management, Inc. advertisement.

*Primary Examiner*—Timothy F. Simone
*Attorney, Agent, or Firm*—Bruce & McCoy

[57] ABSTRACT

A meat processor having a drum which rotates about an axis perpendicular to its longitudinal axis and shakes while keeping the meat being processed in the drum refrigerated and under a vacuum.

14 Claims, 2 Drawing Figures

U.S. Patent
May 8, 1984
4,446,779
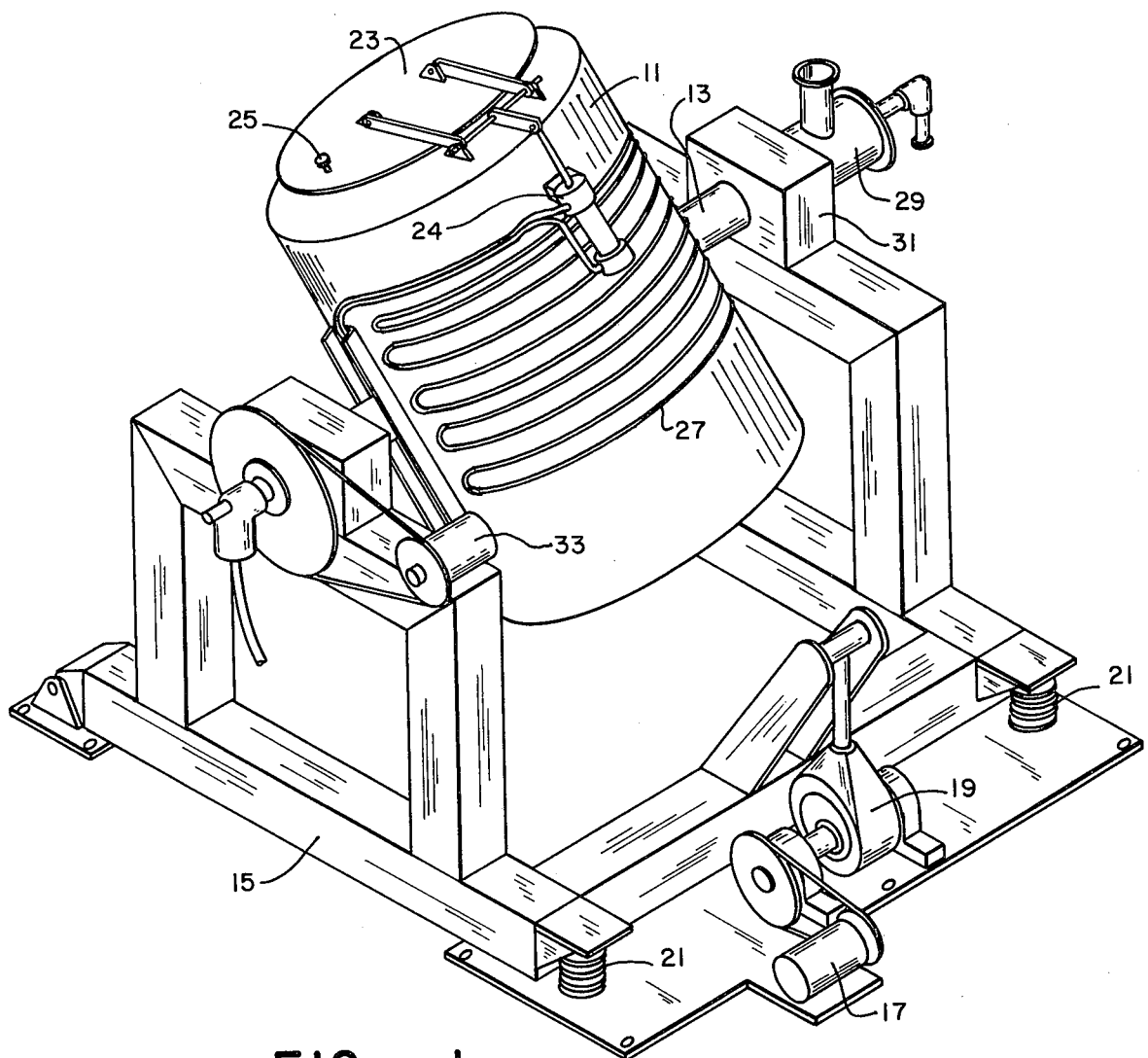
FIG.—1
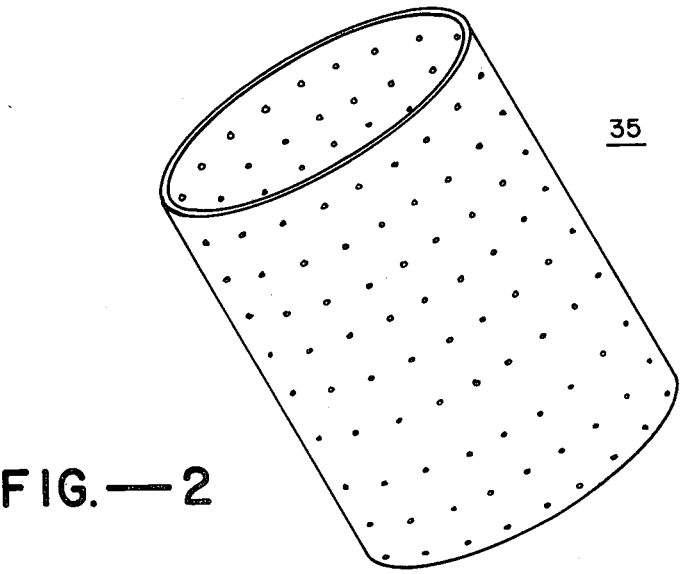
FIG.—2

MEAT PROCESSOR

This application is a continuation of application Ser. No. 213,555, filed Dec. 5, 1980, now abandoned.

BACKGROUND OF THE INVENTION

1. FIELD OF THE INVENTION

The present invention relates to meat processors. More particularly it relates to a meat shaker and tumbler for bringing myosin and other proteins to the surface of the meat and for effecting better distribution, retention, and absorption of the fluids, brine, pickle, or additives in the meat.

2. DESCRIPTION OF THE PRIOR ART

In recent years it has been determined that it is desirable in the treatment of processed meats to bring myosin proteins to the surface of the meat. Myosin serves as a binder when meat pieces are pressed together and cooked causing the meat to reform as an integral mass. One method of extracting myosin from cured meats, such as ham, involves tumbling the meat in a large drum. The drum is usually provided with internal radially projecting baffles or paddles affixed longitudinally to the internal wall and sometimes to the end of the drum. The drum is then rotated on its cylindrical axis which is disposed during rotation at an angle somewhere between horizontal and substantially less than vertical. During rotation, the internal baffles move those portions of the meat which are at the bottom of the drum out from under the stack of meat. They lift the meat up the side of the drum then drop it back into the mass of meat. The action is very much like a powered cement mixer.

The problems with this type of tumbler are that it may take six to eighteen hours of tumbling (with rest periods) to bring the myosin to the surface of the meat, and the action of the tumbling is very rough on the meat. The baffles tear and cut the pieces of meat, which are pulled out from under the stack, and all of the pieces of meat are repeatedly subjected to this tearing because of the long treatment time. The result is that this type of tumbler can only be used where the appearance of the meat pieces is not important in the final product. Delicate meat pieces, such as bone-in hams, poultry, water-added boneless hams, and other water-added products cannot be tumbled in these large drums successfully. The tumbling process destroys the appearance and unity of the pieces of meat.

Even for those types of meat which can be tumbled in the prior art machines, the action is very slow, and a large number of drums are required to process a volume of meat. Being able to reduce the processing time reduces directly the number of machines involved. This can effect great savings in the capital outlay necessary to establish a processing line and thereby reducing the price of the end product. A further problem with the meat processing machines of the prior art is that the action of the paddles or blades on the meat tears it and causes the meat pieces to lose their appearance and marketability, thereby adversly effecting the yield and quality of the product.

It is known that tumbling process time can be reduced by placing the meat under a vacuum while it is being tumbled. Thus, some of the tumblers on the market are sealed to permit a vacuum to be established in the container so the meat is tumbled in a partial vacuum. This, however, does not solve the problem of the tearing of the meat or of lower yields.

The present invention has been found to greatly reduce the processing time for extracting myosin to the surface of the meat from the six to eighteen hours of the prior art to times of less than an hour. This is done by simultaneously tumbling the meat, with a different motion or action than has been predominately used by the prior art, and shaking the meat. In addition, this may be done in a refrigerated vacuum for a further reduction in process time. Because the present invention does not tear or cut meat pieces, even delicate pieces of meat can now be tumbled for myosin extraction. The myosin is brought to the surface by the interaction of the meat pieces which occurs as they roll and slide over each other during tumbling and from the rubbing which occurs from the shaking. In the present invention, all of the meat in the drum is also subjected to large pressure changes which greatly reduce the processing time as the drum is rotated. All of the meat rolls over and moves from the top of the pile of meat to the bottom while being shook but without tearing or pulling. Each piece of meat is mashed and crushed by this action rather than being torn out from under the pile by paddles and lifted and dropped on top of the pile. The effect is to massage the meat rather than to tear, batter, and abuse it. Shaking the meat under a refrigerated vacuum while tumbling it also contributes to a large reduction in processing time. It appears that the combined massaging and shaking action of the present invention on the meat causes greater absorption and retention of the protein juices, brine, pickle, or additives in the meat which results in a more nutritious product as well as a higher yield. This means that proteins which drain out of the meat with lost pickle can be more completely retained. It is believed that the combination of massage tumbling and the simultaneous shaking action produces the enhanced processing effects of the present invention.

SUMMARY OF THE INVENTION

The present invention is a meat processor which includes a drum arranged to rotate about an axis perpendicular to its longitudinal axis. Means are also provided for shaking the drum while it rotates, and it is provided with means to refrigerate and to evacuate it. In addition, the drum includes a removable insert which can work the meat to further increase the rate of myosin extraction.

OBJECTS OF THE INVENTION

It is an important object of the present invention to provide a meat processor which tumbles the meat being processed and alternately moves it from the top of a pile of meat to the bottom, without cutting or tearing the individual meat pieces, so that the meat is massaged.

It is another object of the present invention to provide a meat processor which shakes the meat while it is being tumbled.

It is a further object of the present invention to keep the meat under a refrigerated vacuum while it is being processed.

It is still another object of the present invention to greatly reduce the time necessary to bring myosin protein to the surface of the meat being processed.

It is still a further object of the present invention to provide a meat tumbler which can be utilized to treat a wide variety of meats, including delicate pieces of meat such as bone-in hm, bacon bellies, pork loins, picnic and poultry pieces, and water-added meat products.

It is yet another object of the present invention to provide a meat processor which causes a faster and more complete absorption of brine, pickle, or other additives into meat, and stabilization of the same in the meat, for higher quality and yield.

And it is yet a further object of the present invention to provide a meat processor which can be adjusted to process less delicate meats by increasing the working of the meat while it is in the processor to further reduce the time for extracting the myosin.

Other objects of the invention will become apparent when the description thereof is considered in conjunction with the accompanying drawings.

BRIEF DESCRIPTION OF THE DRAWINGS

FIG. 1 is a perspective view of the meat tumbler of the present invention; and

FIG. 2 is a perspective view of an insert for the drum thereof.

DESCRIPTION OF THE PREFERRED EMBODIMENT

In the meat processor of the present invention, a drum 11 is provided which is arranged to rotate about an axis 13 perpendicular to its longitudinal axis. The drum could of course be of equal length and width and depth so that there is no one axis longer than any other and any axis could be the longitudinal axis. The drum can be any configuration, but a cylindrical shape is preferred for ease of manufacture and cost effectiveness. In any drum that has a longitudinal axis, one longer than the other, the preferred method is to rotate the longer axis about the rotational axis although rotation along the other axis would also serve the purpose but less efficiently. The reason the most efficient action appears to be obtained from rotating the drum perpendicular to its longitudinal axis is that this orientation creates the largest distance for the meat to fall during rotation and accordingly, the greatest massaging pressures on the meat in the drum.

The drum is preferably smooth walled internally so that it does not catch or tear the meat in any way. The drum is preferably operated at about three fourths full so that when the meat slides from end to end as the drum rotates, it also tumbles over the other pieces and each piece changes position from the top of the pile to the bottom due to the tumbling action. The action alternately mashes and then relieves the pressure on each meat piece being rolled over internally in the drum as it moves from the top to the bottom so that the meat is continually cycled from a low pressure environment to high pressure constriction under the load of meat depending on whether it is at the top of the pile or at the bottom.

The drum rotates fairly slowly with a preferred rotation rate of between one (1) and twenty-five (25) rpm. The large size drums, which are considered optimum at the present time, have approximately a 2000 pound capacity when three quarters full. Between five (5) and sixteen (16) rpm seems to be the optimum rotation rate within the preferred speed range.

Means are provided for shaking the drum while it rotates. This is done by supporting the drum on a frame 15 and having the frame arranged so that at least part of it can be reciprocated in a cycle for a predetermined distance and at a rate which will effect the means for shaking the drum. In the present invention, the frame is arranged to pivot at one end about a horizontal axis so that the other end can be moved up and down. A means is provided for reciprocating the movable end of the frame up and down through a variable distance of between $\frac{1}{4}$ and 2 inches at a controllable rate with the range between $\frac{1}{2}$ and $1\frac{1}{2}$ inches seeming to be the optimum. This is done by a motor 17 which is connected to the movable portion of the frame through an adjustable throw crank shaft 19. This mechanical arrangement causes rythmic shaking to occur. Springs 21 are mounted under the movable end of the frame to help support the weight of the drum and to reduce the power requirements necessary to effect the shaking. Variable pressure airbags can be used to assist the springs to compensate for different weight loads in the tumbler. The rate of shaking of the drum, which seems to be most effective, is between 25 and 500 cycles per minute with the most effective shaking occurring in the cycle range of 100 to 300 cycles per minute. The rate varies with different types of meat. More delicate meats have to be tumbled and shook slower.

A means is provided for evacuating the unoccupied interior space of the drum after it has been filled to its operating volume with the meat to be processed. This is most easily done by making the cover 23, which is removable or openable, air-tight. Because of the elevated location of the cover when the tumbler is upright, the opening and closing of the cover can be actuated by an air cylinder 24.

A vacuum connecting 25 is mounted to the drums to permit a vacuum to be pulled on the drum after the drum has been filled to its operating capacity with meat. This effects the evacuation of most of the air from the unoccupied interior space of the drum. For ease of manufacture, the vacuum connection is made integral to the cover of the drum.

A means is also provided for refrigerating the meat being processed while it is in the drum. This is done by providing refrigerating coils 27 which are secured to the drum. The coils are fed through rotatable connections 29 which are standard items. These rotatable connections are integral to the rotatable journals 31 mounted on the frame and supporting the drum. Refrigerating the meat retards bacteria growth, counteracts heat buildup from the interaction of the meat pieces, and stimulates myosin extraction.

A motor 33 is provided for rotating the drum. In the preferred embodiment, both the drum drive motor, for rotating the drum, and the crank shaft drive motor, for shaking the drum, are variable speed hydraulic drive. The variable speed can be controlled by an operator during operation.

The combined action of shaking and tumble massaging in the manner of the present invention has been shown to decrease the time necessary to bring the myosin to the surface of the meat from the six to eighteen hours of the prior art machines to less than an hour and to a matter of minutes when combined with refrigerating the meat and working under a vacuum in the tumbler. The effect of processing by this machine is to also cause faster and more complete absorption of the brine, pickle, or other additives thereby producing higher quality meat with greater additive retention for higher yields.

The decrease in processing time also decreases by a direct proportion the number of machines necessary to keep a desired production rate. Therefore it is obvious that the improvement provided by the present invention is extremely important to the meat processing industry and will have significant economic impact in the savings for meat processors.

The shaker-tumbler of the present invention also makes it possible to treat delicate meat for myosin extraction and enchanced fluid retention without adversely affecting the appearance of the final product.

When the appearance of the meat is not important, a removeable insert or liner 35 is provided for the drum which includes means for working the meat processed in the drum to further increase the rate of myosin extraction. In a preferred embodiment, the means for working the meat includes a roughened surface inside the liner which abrades the meat to release the myosin. Sharp internal projections formed in the insert such as by punching through from the outside has proved effective and least expensive to form. The insert is used only where the appearance of the meat is unimportant, such as for a sectioned and formed product, but reduced processing time is most important.

It can be seen from the foregoing description of the preferred embodiment of the invention that it will achieve the objects attributable thereto, and while it has been described in considerable detail, it is not to be limited to such specific details as set forth except as may be necessitated by the appended claims.

I claim:

1. A meat processor comprising
 a drum relatively smooth walled interior cavity having an internal vertical cross-section disposed parallel to the longitudinal axis of said drum which, when said drum is rotated about an axis perpendicular to the plane of said cross-section, causes the meat disposed in said drum to tumble and slide from end to end in said drum, and
 means for shaking said drum up and down with a preferred variable rate in the plane of said cross-section with a preferred predeterminable variable positive vertical displacement of the drum irrespective of the rate of rotation of the drum or the weight of meat being processed in the drum.

2. The meat processor of claim 1 wherein said drum can be variably rotated between one (1) and twenty-five (25) revolutions per minute.

3. The meat processor of claim 1 wherein said drum can be variably shook at a rate between twenty-five (25) and five hundred (500) cycles per minute.

4. The meat processor of claim 1 including means for evacuating the unoccupied interior cavity of said drum after it has been filled to its operating volume with the meat to be processed.

5. The meat processor of claim 1 including means for refrigerating the meat to be processed while it is in the drum.

6. The meat processor of claim 1 including a removable insert for said drum, said insert including means for working said meat to increase the rate of myosin extraction therefrom.

7. The meat processor of claim 1 wherein the means for shaking said drum up and down includes a frame supporting said drum arranged so that at least a portion of it can be reciprocated up and down to effect the shaking of the drum.

8. A meat processor comprising
 a drum with a relatively smooth walled interior cavity having a substantially rectangular vertical cross-section disposed parallel to the longitudinal axis of said drum, said drum being arranged to rotate about a horizontal axis perpendicular to the plane of its rectangular cross-section at a variable rate between one (1) nd twenty-five (25) rpm,
 means for simultaneously shaking said drum up and down with variable positive vertical displacement in the plane of said rectangular cross-section at a rate between twenty-five (25) and five hundred (500) cycles per minute, and
 a frame supporting said drum, said frame being arranged so that at least a portion of it can be reciprocated up and down to effect the shaking of said drum with the remaining portion of said frame secured to the reciprocating portion thereof with a hinge connection.

9. The meat processor of claim 8 including means for evacuating the unoccupied interior cavity of said drum after it has been filled to its operating volume with meat to be processed and means for refrigerating the meat to be processed while it is in the drum.

10. The meat processor of claim 8 including a removable insert for said drum, said insert including means for working said meat to increase the rate of myosin extraction therefrom.

11. A meat procesor comprising
 a drum having a substantially cylindrical interior cavity, said drum being mounted on a frame to rotate end for end about a horizontal axis perpendicular to the longitudinal axis of said cavity, said frame being arranged to pivot at one end so that the other end can be moved generally up and down a predetermined variable distance to permit the drum to be vertically displaced,
 means attached to said frame for rotating said drum at a variable rate between one (1) and twenty-five (25) revolutions per minute,
 means for reciprocating the movable end of said frame up and down through said predetermined distance with positive displacement at a variable rate between twenty-five (25) and five hundred (500) cycles per minute, and
 means for evacuating the unoccupied interior cavity of said drum after it has been filled to its operating volume with meat to be processed.

12. The meat processor of claim 11 including means for refrigerating the meat to be processed while it is in the drum.

13. The meat processor of claims 11 or 12 including a cyclindrical removable insert for said drum, said insert including means for working said meat to increase the rate of myosin extraction therefrom.

14. A meat processor comprising
 a frame pivoted at one end to permit at least partial rotation of said frame about a horizontal axis and to permit the remainder of said frame to be cycled up and down,
 a motor driven adjustable throw crank shaft connected to a movable portion of said frame and arranged to cycle it up and down a predetermined distance at a variable rate between twenty-five (25) and five hundred (500) cycles per minute,
 spring means and variable pressure airbags mounted under the movable end of the frame to assist the up and down cycling of said frame,
 a drum having substantially cyclindrical interior cavity, said drum being mounted on said frame and arranged to rotate about a horizontonal axis perpendicular to the longitudinal axis of said cavity, a motor mounted on said frame arranged to rotate said drum at a variable rate between one (1) and twenty-five (25) revolutions per minute, an air-tight cover for said drum, a vacuum connection mounted on said drum to permit a vacuum to be pulled on said cavity after it has been filled to its operating volume with meat to be processed to permit evacuation of air from the unfilled portions of said cavity, refrigerating coils secured to said drum, said coils being fed through rotatable connections integral to rotatable journals mounted on said frame supporting said drum, and a removable cylindrical insert for the cavity of said drum, said insert including means for working said meat to increase the rate of myosin extraction therefrom.

* * * * *